(12) United States Patent
Keller

(10) Patent No.: US 7,711,970 B2
(45) Date of Patent: May 4, 2010

(54) BUS CONTROLLED POWER SWITCH

(75) Inventor: Anton Werner Keller, Arni (CH)

(73) Assignee: Thomson Licensing, Boulogne-Billancourt (FR)

( * ) Notice: Subject to any disclaimer, the term of this patent is extended or adjusted under 35 U.S.C. 154(b) by 523 days.

(21) Appl. No.: 10/531,220

(22) PCT Filed: Oct. 16, 2003

(86) PCT No.: PCT/IB03/05478

§ 371 (c)(1),
(2), (4) Date: Apr. 13, 2005

(87) PCT Pub. No.: WO2004/036401

PCT Pub. Date: Apr. 29, 2004

(65) Prior Publication Data

US 2006/0062030 A1 Mar. 23, 2006

Related U.S. Application Data

(60) Provisional application No. 60/419,632, filed on Oct. 18, 2002.

(51) Int. Cl.
*G06F 1/32* (2006.01)
(52) U.S. Cl. .................. 713/323; 323/335; 327/365; 361/603; 361/623
(58) Field of Classification Search .............. 713/300, 713/310, 320, 323; 327/365; 323/335; 361/603, 361/623; 363/21.07
See application file for complete search history.

(56) References Cited

U.S. PATENT DOCUMENTS 4,484,295 A * 11/1984 Bedard et al. ................ 708/8

| 4,542,303 | A | | 9/1985 | Jarrett et al. |
| 5,511,205 | A | | 4/1996 | Kannan et al. |
| 5,617,466 | A | * | 4/1997 | Walance ................ 379/28 |
| 5,705,948 | A | | 1/1998 | Moller |
| 5,903,765 | A | | 5/1999 | White et al. |
| 6,426,887 | B2 | | 7/2002 | Nagai et al. |
| 6,427,183 | B1 | | 7/2002 | Seidenberg |

(Continued)

FOREIGN PATENT DOCUMENTS

EP 0317007 5/1989

(Continued)

OTHER PUBLICATIONS

Neil H.E. Weste: "Principles of CMOS VLSI Design", Oct. 1, 1994, Addison Wesley, USA, pp. 226-230.

(Continued)

*Primary Examiner*—Thuan N Du
(74) *Attorney, Agent, or Firm*—Robert D. Shedd; Harvey S. Fried; Shabtay S. Henig

(57) ABSTRACT

A peripheral device has a bus-controlled switching arrangement for operating a power supply. A device comprises a bus interface adapted for communicating with a remote device via a bus. A switch circuit is connected between the bus interface and a power supply. The switch circuit is operative, when the power supply is in an inactive state, for sensing bus activity and for generating a signal for activating the power supply in response to the sensed bus activity, wherein the switch circuit has no power dissipation when no activity is sensed on the bus.

8 Claims, 4 Drawing Sheets

U.S. PATENT DOCUMENTS

| | | | |
|---|---|---|---|
| 6,463,543 B1 * | 10/2002 | Alvarez | 713/323 |
| 6,671,750 B2 | 12/2003 | Nakamura | |
| 6,816,976 B2 * | 11/2004 | Wright et al. | 713/323 |
| 6,963,984 B2 * | 11/2005 | Shiga | 713/310 |
| 7,032,120 B2 * | 4/2006 | El-Kik et al. | 713/320 |
| 2003/0058704 A1 | 3/2003 | Lovett et al. | |

FOREIGN PATENT DOCUMENTS

| | | |
|---|---|---|
| JP | 8-221156 | 8/1996 |
| JP | 9-308105 | 11/1997 |
| JP | 2001-285320 | 10/2001 |
| JP | 2002-007003 | 1/2002 |

OTHER PUBLICATIONS

Search Report Dated Oct. 11, 2004.

* cited by examiner

BUS CONTROLLED POWER SWITCH

RELATED APPLICATIONS

This application claims the benefit, under 35 U.S.C. §365 of International Application PCT/IB03/05478, filed Oct. 16, 2003, which was published in accordance with PCT Article 21(2) on Apr. 29, 2004 in English and which claims the benefit of U.S. provisional patent application No. 60/419,632, filed Oct. 18, 2002.

FIELD OF THE INVENTION

The present invention relates generally to power supplies, and more particularly, to techniques for turning on and off power supplies.

BACKGROUND OF THE INVENTION

Peripheral devices such as routers, hubs, printers, scanners and the like, are often connected to a computer and/or to one another via one or more bus systems. In relatively small networks like SOHO (Small Office and Home Office) and DHT (Digital Home networks), most of the peripheral devices are turned on via a central power switch, or by turning on each of the devices individually. However, this activation operation becomes more inconvenient when the peripheral device is not in the same room as the computer. The power control problem is exacerbated when multiple peripheral devices are located remote from one another and/or from the computer(s) in the network. Consequently, such devices are often not turned off, but rather left in standby mode, thereby constantly consuming power. A peripheral device that senses bus inactivity, while maintaining the device without dissipating power in the sensing circuitry when there is no activity on the bus, is highly desired.

SUMMARY

A peripheral device has a bus-controlled switching arrangement for operating a power supply. The device comprises a bus interface adapted for communicating with a remote device via a bus. A switch circuit is connected between the bus interface and a power supply. The switch circuit is operative, when the power supply is in an inactive state, for sensing bus activity and for generating a signal for activating the power supply in response to the sensed bus activity, wherein the switch circuit has no power dissipation when no activity is sensed on the bus.

DETAILED DESCRIPTION

Figure 1:
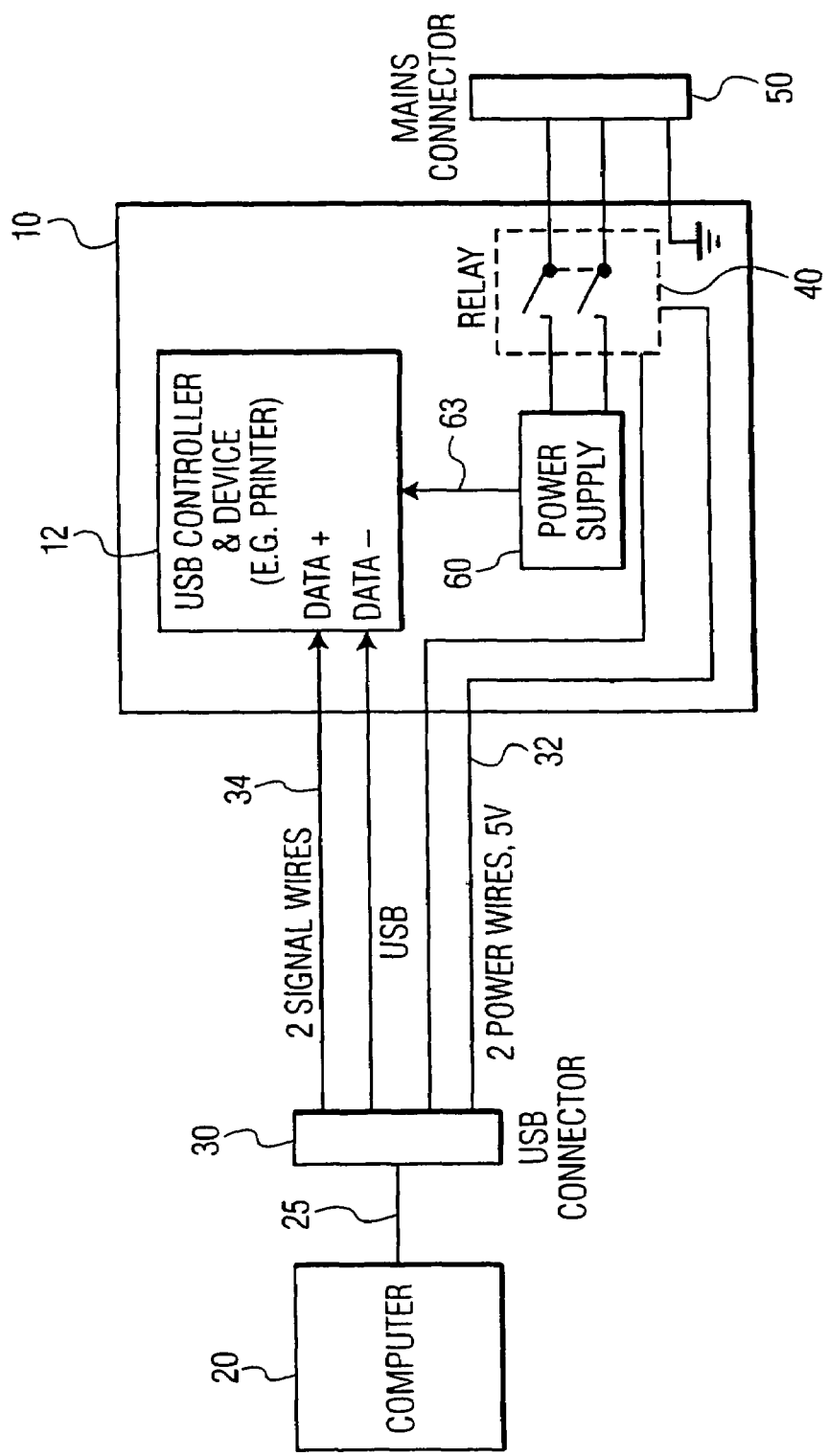
FIG. 1 is an exemplary illustration of a peripheral device having a bus-controlled switching arrangement useful for understanding the principles of the present invention.

FIG. 1 shows a peripheral device 10, such as a printer, connected to another electronic device 20 such as a computer, via bus 25 connected to bus interface 30. Note that device 10 may be connected directly to external device 20 via bus 25 and bus interface 30, or may be coupled through a computer network, such as an Ethernet network. As shown in FIG. 1, bus interface 30 comprises a universal synchronous bus (USB) connector for communicating power and/or data signals to and/or from printer 10. In the embodiment shown in FIG. 1, a pair of input lines 34 convey data signals to USB controller 12 from computer 20. Power lines 32 convey power signals from the computer 20 via connector 30 to a power switch 40. Power switch 40 may comprise a simple relay, a solid state switch, or any other switching device capable of switchably connecting the mains power connection 50 with power supply 60. In operation, when computer 20 is powered on, the USB power line 32 becomes active, causing switch 40 to close, thereby activating power supply 60 and enabling power to be provided to controller 12 for processing the data received from the external device. It is understood that, upon activation, the device may enter either a standby mode or a run mode of operation. When computer 20 is turned off or the USB connection is removed, the signal on power lines 32 causes switch 40 to change state or "open", thereby disabling connection of power supply 60 from mains connection 50, and hence automatically turning printer 10 "off".

Figure 2:
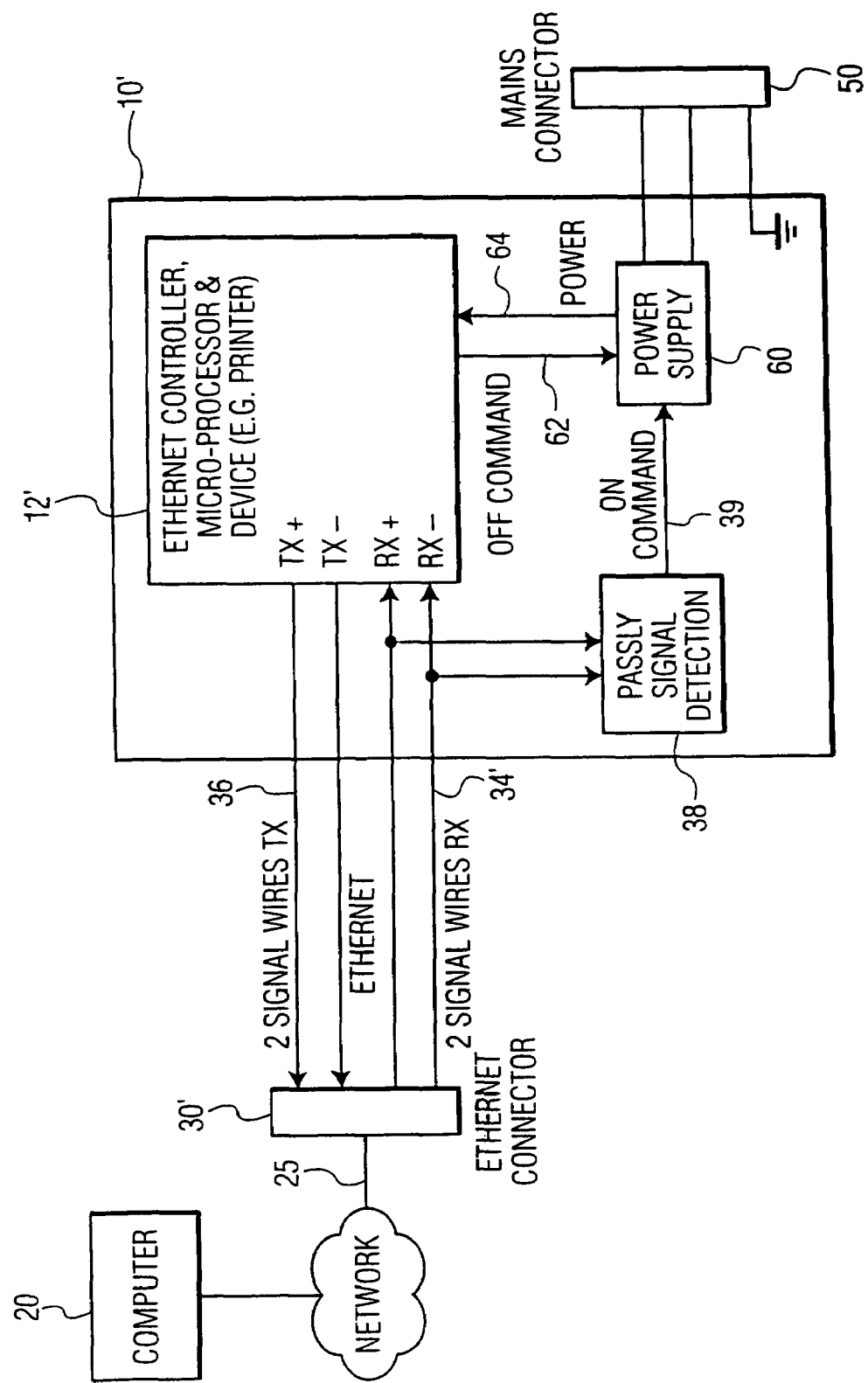
FIG. 2 is another exemplary illustration of a peripheral device having a bus-controlled switching arrangement useful for embodying the principles of the present invention.

FIG. 2 illustrates an exemplary system useful for embodying an aspect of the present invention. As shown in FIG. 2, bus interface 30' comprises an Ethernet connector for connecting peripheral device 10' to an external device (not shown) via bus 25'. In this embodiment, a bus system is implemented without a power distribution from an external device. A pair of input lines 34' from connector 30' convey data signals to ethernet controller 12'. A pair of output lines 36 carry output signals from controller 12' to ethernet connector 30' for transfer onto bus 25 for routing to an external device on the network. In networks such as Ethernet networks (e.g. Ethernet 10/100base-T networks), a master device (such as a PC) periodically scans bus 25 by providing periodic scanning pulses on input lines 34'. These scanning pulses are detected by passive signal detector 38. The small amount of scanning energy in the scanning pulses detected by detector 38 causes the detector to generate a signal 39 to activate or turn "on" power supply 60 to provide power to controller 12'.

When the power supply 60 is activated, the controller or microcomputer 12' is operable to detect at its input terminals RX+, RX−, whether or not bus 25 is used or disconnected from the system. In the event that controller 12' senses the absence of bus activity over a predetermined time interval, or a disconnection of the bus interface from the system, the controller generates a command signal 62 to turn "off" the power supply 60.

Figure 3:
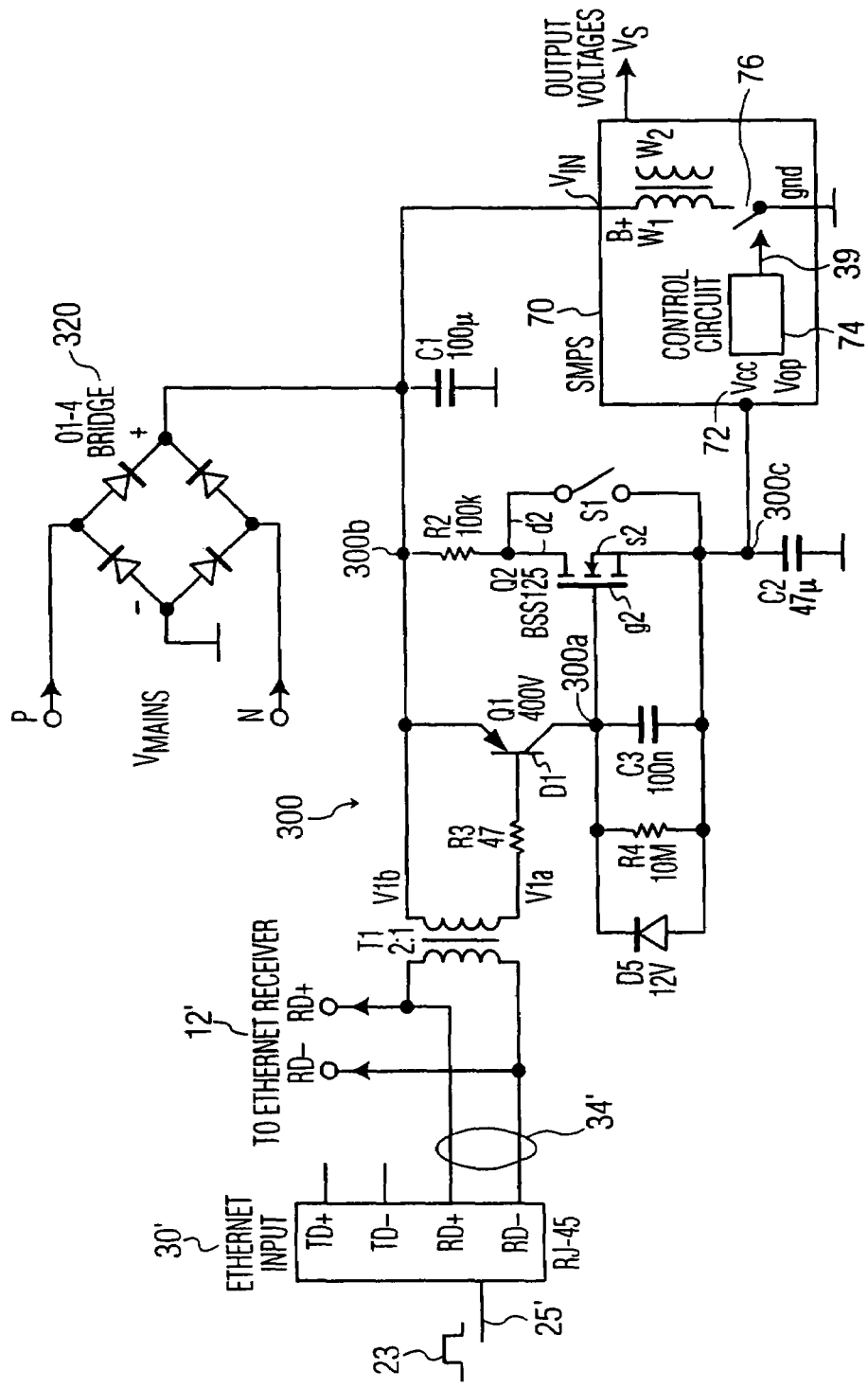
FIG. 3 is another exemplary illustration of a peripheral device having a bus-controlled switching arrangement useful for embodying the principles of the present invention.

It is understood that a network such as an Ethernet network does not carry power. However, as previously mentioned, bus activity is characterized by pulse packages traveling on the network. These pulse packages can be detected and used for turning on the peripheral. FIG. 3 illustrates an exemplary detailed circuit operable for sensing bus inactivity without consuming power when the peripheral device is in the inactive state. As shown in FIG. 3, the peripheral device includes a circuit 300 for providing this functionality. Pulse packages 23 carried on bus 25' are received at ethernet bus connector 30' and input to circuit 300 over signal lines 34' from ports RD+, RD−. The signal lines carry the data signals indicative of bus activity to the input ports of ethernet controller/receiver 12'. Signal lines 34 are also connected to transformer T1, which isolates the bus from the power supply. The output V1a of transformer T1 is connected to the base b1 of pnp transistor Q1 by resistor R3, which provides an input impedance for the network 25. The output V1b of transformer T1 is connected to emitter e1 of Q1 at node 300b. The collector c1 of transistor Q1 is connected at node 300a to capacitor C3. Zener diode D5 and resistor R4 are connected in parallel with one another and with capacitor C3. Metal Oxide Semiconductor Field Effect Transistor (MOSFET) Q2 has a gate terminal g2 connected at node 300a. Drain Terminal d2 of Q2 is connected via resistor R2 to node 300b while source terminal s2 is connected to charge capacitor C2 at node 300c. The value of resistor R2 is chosen to have a relatively large value so as not to dissipate a significant amount of power during the active mode of the power supply, while still providing for sufficient current to capacitor C2 for providing power for the switched mode power supply control circuit 74. Switched mode power supply (SMPS) 70 is connected to node 300c at a first input 72 for receiving in control circuit 74 a supply voltage Vcc. SMPS 70 further includes a switch 76 responsive to the output of the control circuit 74 for periodically energizing the primary winding w1 of transformer T2.

According to an inventive aspect, the peripheral device is arranged such that its sensing circuitry for sensing bus inactivity does not dissipate any power when in the inactive state. More particularly, when the device is inactive and there is an absence of bus activity on lines 34', transistor Q1 is off and no power is dissipated by the sensing circuitry. Because Q1 is off, capacitor C3 is not charged. Hence, Q2 is also off, so that no power is dissipated in Q2. When no pulses are present on input lines 34' transistors Q1 and Q2 do not dissipate energy.

However, as shown in FIG. 3, transistor Q1 is responsive to bus activity on input lines 34' for charging capacitor C3 to cause Q2 to be biased on. This in turn causes C2 to charge to supply a voltage Vcc to activate the control circuit 74 of SMPS 70 to provide an output power supply voltage Vs. In particular, as shown in FIG. 3, pulse signals 23 indicative of bus activity are received over lines 34' and isolated by step down transformer T1. The pulse signals input at base terminal b1 serve to bias transistor Q1 on so that Q1 rectifies the isolated pulse signals and charges capacitor C3. The voltage across C3 controls the operation of MOSFET Q2, which charges C2. More particularly, when the voltage across C3 reaches a predetermined threshold level of transistor Q2, MOSFET transistor Q2 is biased on to provide a current to charge capacitor C2. When the voltage V on C2 reaches the threshold startup voltage Vcc, the power supply control circuit 74 is activated to generate a periodic switching signal 39 to activate switch 76 to periodically connect transformer T2 with GND to generate a switched mode output supply voltage Vs for the peripheral device. The power supply remains active or "on" until the absence of bus activity is detected by circuit 300, and the additional delay caused by the time constants of the R4, C3, and R2, C2 circuit components. Note that the time constants provide additional noise immunity for the circuit 300. When no pulses are present on the bus interface, C2 eventually discharges to below a minimum operating value (Vop), causing the control circuit to be inactivated and turning off the power supply. It is understood that the minimum operating voltage value for inactivating the supply may be the same as, or, more preferably, less than, the threshold startup voltage Vcc. This is because the startup voltage is typically greater than the normal or average voltage level for operating the power supply. In any event, it is understood that a minimum operating voltage level at C2 exists such that, when C2 is discharged below that level, the control circuit becomes inactivated and the power supply is turned off.

It is understood that bypass switch S1 provides a bypass for the above described bus-controlled mode of operation. More particularly, bypass switch S1 enables the user to bypass Q1, Q2 and associated circuitry for sensing input pulses from bus 25' and activating the power supply, and instead provides current through R2 to and S1 to directly charge capacitor C2. In this configuration, when S1 is closed, the power supply is activated upon connection with the mains voltage V mains, independent of the activity on the bus. When switch S1 is open, the peripheral device is in remote start-up mode, wherein data signals from the bus are used to activate the power supply. Of course, as discussed above, when switch S1 is open and no input pulse signals 23 are present on the bus, the circuitry for sensing bus inactivity does not consume any power when in the inactive state, including transistors Q1 and Q2.

Figure 4:
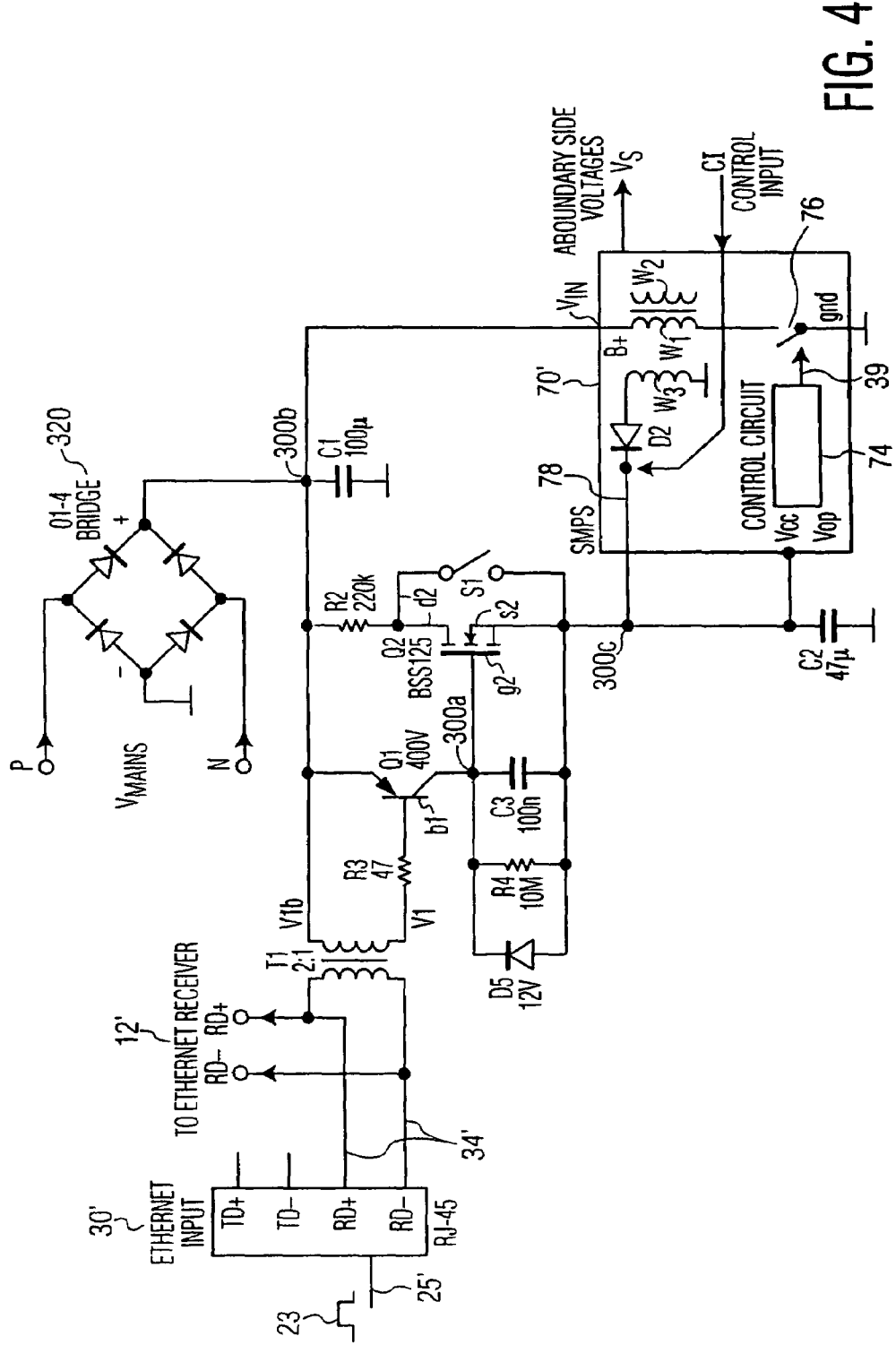
FIG. 4 is another exemplary illustration of a peripheral device having a bus-controlled switching arrangement useful for embodying the principles of the present invention.

As discussed herein, the circuit of FIG. 3 is operable such that when pulses 23 are no longer present on the input lines, the power supply is turned off after bus inactivity results in shutoff of Q1 and Q2, and subsequent discharge of C2 according to the time delays of the circuit. However, the above described shutdown method may be undesirable in certain applications, such as when a printer receives instructions from a computer to perform certain print operations, and initiates processing to execute its tasks. In this case, the peripheral device should remain active to complete print operations even when there is no bus activity on the network. FIG. 4 illustrates an exemplary embodiment for maintaining the power supply in an active state despite an absence of bus activity.

As shown in FIG. 4, power supply 70' includes additional winding w3 connected to diode D2, which is coupled to capacitor C2 through (normally closed) switch 78. When Q2 is on, current passes through R2 and Q2 to charge capacitor C2. When the threshold startup voltage level Vcc is reached, the control circuit 74 is activated to cause periodic switching of switch 76 to GND. This causes transformer T2 to be periodically energized so as to transfer power to the secondary side through w2. In this case, the winding w3 coupled to the primary side of T2 and connected by diode D2 to capacitor C2 through switch 78 provides an additional source of power to capacitor C2 to the control circuit 74 to effectively latch the voltage at the input of the power supply 70'. This ensures that C2 is charged to the appropriate level to maintain activation of the power supply, independent of any subsequent cessation of pulse signals 23 on the bus. Therefore, the power supply of FIG. 4 is operable such that after the power supply is initially activated (e.g. by sensing of bus activity), the device can continue operating despite a later absence of bus activity.

The power supply may be turned off via a control signal CI at control input 75 of power supply 70'. The control signal CI may be input from a microprocessor in controller/receiver 12' which, after detecting the absence of signal activity on the bus over a predetermined time interval, and upon completion of its tasks (e.g. completion of printing operations), generates a control signal CI to open switch 78. This causes C2 to be discharged, inactivating the control circuit 74 and turning off power supply 70'. It is understood that the control input and shutoff functionality associated with the microprocessor receiver, as well as the latching and shutdown processes associated with the power supply, may be implemented as executable instructions in software, as circuit elements and/or components in hardware, as programmable memory in firmware, and combinations thereof.

Although the invention has been described in terms of exemplary embodiments, it is not limited thereto. The appended claims should be construed broadly to include other variants and embodiments of the invention which may be made by those skilled in the art without departing from the scope and range of equivalents of the invention.

The invention claimed is:

1. A switch for applying operating power from a peripheral device power source to a peripheral device, the peripheral device being configured for communication with at least one other electronic device by a data bus, the switch including a circuit for sensing data signals on said data bus and providing an indication of sensed data signals to said peripheral device power source to apply power to said peripheral device in response to said sensed data signals, said sensing circuit comprising:

a transformer having a first winding coupled to said data bus and a second winding coupled to a first switching transistor, wherein the switch has no power dissipation when no activity is present on the data bus.

2. The switch of claim 1, wherein the first switching transistor is brought from a non-conducting state to a conducting state in the presence of activity on said data bus.

3. The switch of claim 2, further comprising a second switching transistor having an input coupled to a capacitor, wherein the second switching transistor is brought from a non-conducting state to a conducting state in response to a charge on said capacitor exceeding a threshold level when said first switching transistor is in said conducting state.

4. The switch of claim 3, further comprising a capacitor coupled to the output of the second switching transistor for providing an input voltage to a control circuit of the power supply for activating or inactivating the power supply according to the level of the input voltage.

5. The switch of claim 1, wherein the power supply further includes a latching circuit responsive to initial activation of said power supply for providing a voltage signal to the power supply sufficient to maintain the power supply in an active state independent of the bus activity.

6. The switch of claim 5, wherein a control input of said power supply is coupled to a controller of said peripheral device for receiving a control signal to cause said power supply to become inactive when there is no activity on said bus.

7. The device of claim 6, wherein said controller is configured to provide said control signal to said control input of the power supply after a given time delay based on an absence of bus activity on said data bus.

8. The switch of claim 1, further comprising means for bypassing said switch to provide a path from a source of input supply voltage to said power supply to cause activation of the power supply independent of bus activity.

* * * * *